United States Patent
Adachi

(10) Patent No.: US 9,323,488 B2
(45) Date of Patent: Apr. 26, 2016

(54) IMAGE FORMING APPARATUSES THAT START DOWNLOADING IMAGE DATA IN RESPONSE TO SPECIFYING PRINTING CONDITIONS, IMAGE FORMING SYSTEMS INCLUDING SUCH IMAGE FORMING APPARATUSES, AND COMPUTER-READABLE MEDIA STORING INSTRUCTIONS FOR SUCH IMAGE FORMING APPARATUSES

(71) Applicant: Toyoshi Adachi, Iwakura (JP)

(72) Inventor: Toyoshi Adachi, Iwakura (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 40 days.

(21) Appl. No.: 14/135,212

(22) Filed: Dec. 19, 2013

(65) Prior Publication Data

US 2014/0176997 A1 Jun. 26, 2014

(30) Foreign Application Priority Data

Dec. 25, 2012 (JP) ................................. 2012-281653

(51) Int. Cl.
*G06F 3/12* (2006.01)

(52) U.S. Cl.
CPC ............ *G06F 3/1237* (2013.01); *G06F 3/1212* (2013.01); *G06F 3/1271* (2013.01); *G06F 3/1285* (2013.01); *G06F 3/1253* (2013.01)

(58) Field of Classification Search
CPC ... G06F 3/1211; G06F 3/1212; G06F 3/1213; G06F 3/1214; G06F 3/1237; G06F 3/1253; G06F 3/1271; G06F 3/1285; G06F 3/1286; G06F 3/1287; G06F 3/1288; G03G 15/5016
USPC .......................................... 358/1.15; 399/81
See application file for complete search history.

(56) References Cited

U.S. PATENT DOCUMENTS

2004/0085564 A1* 5/2004 Peavey et al. ................. 358/1.13
2005/0002063 A1* 1/2005 Hanamoto .................... 358/1.18

(Continued)

FOREIGN PATENT DOCUMENTS

| JP | 2000-222160 A | 8/2000 |
|----|---------------|--------|
| JP | 2003-283755 A | 10/2003 |
| JP | 2007-105937 A | 4/2007 |
| JP | 2007-267362 A | 10/2007 |

(Continued)

OTHER PUBLICATIONS

Japan Patent Office; Office Action issued for Japanese Patent Application No. JP 2012-281653, mailed Feb. 23, 2016.

*Primary Examiner* — Allen H Nguyen

(74) *Attorney, Agent, or Firm* — Baker Botts L.L.P.

(57) ABSTRACT

Image forming systems include servers and image forming apparatuses. Image forming apparatuses include first storage devices, printing devices, accepting devices, and first controllers. Printing devices print images corresponding to image data pieces stored in first storage devices. Accepting devices accept instructions. First controllers include first control devices. Servers include second storage devices and second controllers. Second controllers include second control devices. First controllers specify printing conditions for print-target image data pieces based on instructions. First controllers start downloading print-target image data pieces from servers in response to specifying printing conditions for print-target image data pieces. First controllers store downloaded print-target image data pieces in first storage devices. First controllers control printing devices to print downloaded print-target image data pieces stored in first storage devices after accepting print-start instructions at accepting devices. Second controllers transmit print-target image data pieces based on instructions accepted at accepting devices.

20 Claims, 10 Drawing Sheets

(56) References Cited

U.S. PATENT DOCUMENTS

| | | |
|---|---|---|
| 2007/0081186 A1 | 4/2007 | Numata |
| 2007/0206225 A1 | 9/2007 | Shinohara et al. |
| 2008/0259399 A1* | 10/2008 | Wada .......................... 358/1.15 |
| 2009/0201551 A1* | 8/2009 | Uchida ....................... 358/1.15 |
| 2010/0097625 A1* | 4/2010 | Kurihara ..................... 358/1.12 |
| 2012/0081731 A1 | 4/2012 | Suzuki et al. |
| 2012/0314245 A1* | 12/2012 | Nakashima ........ H04N 1/00244 358/1.15 |

FOREIGN PATENT DOCUMENTS

| | | |
|---|---|---|
| JP | 2009-187291 A | 8/2009 |
| JP | 2010-167596 A | 8/2010 |
| JP | 2012-078999 A | 4/2012 |

\* cited by examiner

Fig.8

| | PRINT SETTING | IMAGE WIDTH (pixel) |
|---|---|---|
| RESOLUTION | LOW | 300 |
| | MEDIUM | 600 |
| | HIGH | 1200 |
| SHEET SIZE | A4 | 600 |
| | A3 | 1200 |

IMAGE FORMING APPARATUSES THAT START DOWNLOADING IMAGE DATA IN RESPONSE TO SPECIFYING PRINTING CONDITIONS, IMAGE FORMING SYSTEMS INCLUDING SUCH IMAGE FORMING APPARATUSES, AND COMPUTER-READABLE MEDIA STORING INSTRUCTIONS FOR SUCH IMAGE FORMING APPARATUSES

CROSS-REFERENCE TO RELATED APPLICATION

This application claims priority from Japanese Patent Application No. 2012-281653, filed on Dec. 25, 2012, the disclosure of which is incorporated herein by reference.

BACKGROUND OF THE DISCLOSURE

1. Field of the Disclosure

The invention relates to image forming apparatus, storage media, and image forming systems. More specifically, the invention relates to a technique of downloading an image data piece from a server that stores the image data piece and performing printing based on the downloaded image data piece by an image forming apparatus.

2. Description of the Related Art

An image forming system including an image forming apparatus and a server adopts a known technique in which the image forming apparatus transmits to the server an image data request for transmission of an image data piece, downloads the image data piece from the server, and performs printing based on the downloaded image data piece.

In the known technique of downloading an image data piece and printing the image data piece, print jobs are placed in the server in advance. A print job to be printed is then selected from the one or more print jobs placed in the server via an operation panel of the image forming apparatus. The selected print job is downloaded to the image forming apparatus and printed by the image forming apparatus.

SUMMARY OF THE DISCLOSURE

The known technique has at least the following problem. In the known image forming system, the length of time required to complete a printing process may be directly proportional to the time required to download the image data piece, such that a greater time may be required to complete a printing process when a greater time is required to download the image data piece.

Accordingly, aspects of the invention may address the above-described problem and other problems occurring in the known technique. That is, aspects of the invention may provide for an image forming system in which an image data piece may be downloaded and printed, such that the image forming system may complete a printing process at an earlier timing.

Image forming systems disclosed herein may comprise a server and an image forming apparatus. The image forming apparatus may comprise a first storage device, a printing device, an accepting device, and a first controller. The printing device may be configured to print an image corresponding to an image data piece stored in the first storage device. The accepting device may be configured to accept one or more instruction. The first controller may comprise a first one or more control device. The server may comprise a second storage device and a second controller. The second controller may comprise a second one or more control device. The first controller may be configured to specify a printing condition for a print-target image data piece based on the one or more instructions. The first controller may be configured to start downloading the print-target image data piece from the server in response to specifying the printing condition for the print-target image data piece. The first controller may be configured to store the downloaded print-target image data piece in the first storage device. The first controller may be configured to print the downloaded print-target image data piece stored in the first storage device after accepting a print-start instruction at the accepting device. The second controller may be configured to transmit the print-target image data piece specified based on the one or more instructions accepted at the accepting device.

Image forming apparatuses disclosed herein may comprise a storage device, a printing device, an accepting device, and a controller. The printing device may be configured to print an image corresponding to an image data piece stored in the storage device. The accepting device may be configured to accept one or more instruction. The controller may comprise one or more control device. The controller may be configured to specify a printing condition for a print-target image data piece based on the one or more instructions. The controller may be configured to start downloading the print-target image data piece from a server in response to specifying the printing condition for the print-target image data piece. The controller may be configured to control the storage device to store the downloaded print-target image data piece. The controller may be configured to control the printing device to print the image corresponding to the downloaded print-target image data piece stored in the storage device after accepting a print-start instruction at the accepting device.

Non-transitory computer-readable media disclosed herein may store computer-readable instructions thereon. The computer-readable instructions may, when executed by a processor of an image forming apparatus, instruct the processor to perform certain processes. The certain processes may comprise specifying a printing condition for a print-target image data piece based on one or more instructions accepted by the image forming apparatus. The certain processes may comprise starting downloading the print-target image data piece from a server in response to specifying the printing condition for the print-target image data piece. The certain processes may comprise controlling a storage device to store the downloaded print-target image data piece. The certain processes may comprise controlling the image forming apparatus to print an image corresponding to the downloaded print-target image data piece stored in the storage device after the image forming apparatus accepts a print-start instruction.

Image forming apparatus disclosed herein may determine the print-target image data piece based on a selection instruction and specify print settings for a determined image data piece. Thereafter, downloading of the determined image data piece may be started when the image data piece is determined or when the print settings are changed. A confirmed decision or a temporary decision before confirmation may be made regarding the determination of the image data piece and the change of the print settings. After accepting the printing start instruction, the image forming apparatus may perform printing of the downloaded image data piece.

That is, the image forming apparatus disclosed herein may start downloading the image data piece when the image data piece is determined or when the print settings are changed. Therefore, the downloading of the image data piece may be started before the print start instruction is accepted. Thus, as compared with a configuration in which the downloading of the image data piece is started after the print start instruction is accepted, the downloading of the image data piece may be started at an earlier timing. Consequently, an early completion of the printing process may be accomplished.

According to the aspects of the invention, image forming systems, in which an image data piece may be downloaded and printed, and which may adopt one or more techniques of accomplishing an early completion of a printing process, may be implemented.

Other objects, features, and advantages will be apparent to persons of ordinary skill in the art from the following detailed description of the disclosure and the accompanying drawings.

BRIEF DESCRIPTION OF THE DRAWINGS

For a more complete understanding of the present invention, needs satisfied thereby, and the objects, features, and advantages thereof, reference now is made to the following descriptions taken in connection with the accompanying drawings.

FIG. 8 is a diagram showing correspondences between each print setting and image sizes in the MFP.

DETAILED DESCRIPTION OF EMBODIMENTS OF THE INVENTION

An image forming apparatus according to particular configurations now is described in detail with reference to the accompanying drawings. In particular configurations, the aspects of the invention may be applied to a multifunction peripheral ("MFP") configured to perform a printing function.

Figure 1:
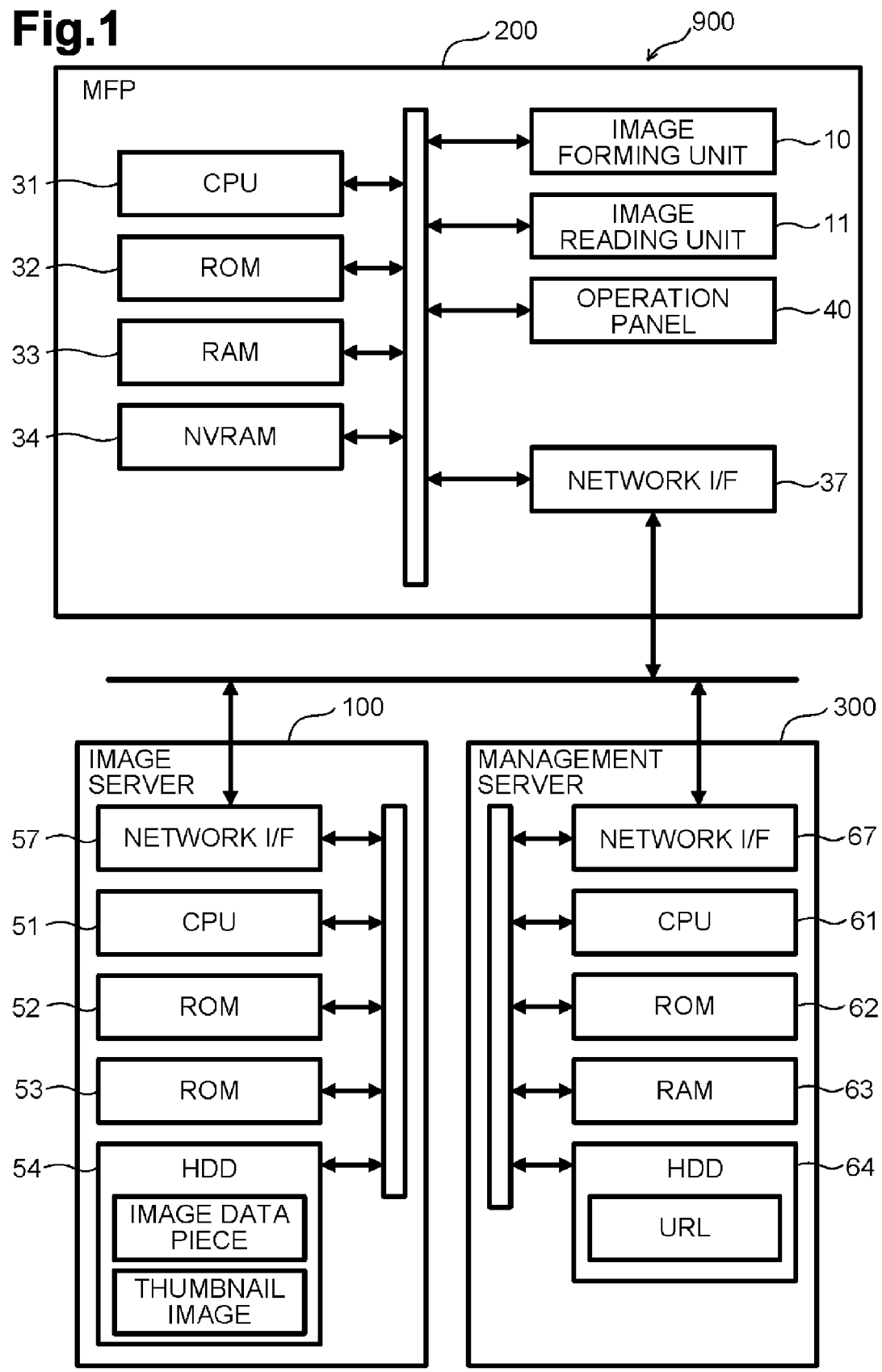
FIG. 1 is a block diagram showing an image processing system.

As shown in FIG. 1, an image forming system 900 (an example of an image forming system) according to particular configurations may comprise an image server 100 (an example of a server), an MFP 200 (an example of an image forming apparatus), and a management server 300. The image server 100 may be configured to store an image data piece therein and transmit the image data piece to a requester in response to an image data request for transmission of the image data piece. The MFP 200 may be configured to transmit the image data request to the image server 100, such that the MFP 200 may receive the image data piece from the image server 100 and print the received image data piece. The management server 300 may be configured to authorize a particular identity (e.g., a user, an account, a group, an access type, a role) and generate a list of images that may be allowed to be downloaded by the authorized identity.

Any number of image forming apparatuses that may print an image data piece may be included and connected to the image forming system 900. Such image forming apparatuses may comprise an MFP, such as the MFP 200, for example. Further, one or more servers that may provide an image data piece may be included with and connected to the image forming system 900. Such servers may comprise and image server, such as the image server 100, for example.

In the image forming system 900, one or more image data pieces to be printed (hereinafter, referred to as a "print-target image data piece") may be selected and, additionally or alternatively, specification of print settings may be input by operating the MFP 200. Selection of one or more print-target image data piece and specification of print settings may be examples of specifying a printing condition. Thereafter, the MFP 200 may transmit an image data request for transmission of the one or more selected image data pieces to an image server (e.g., the image server 100 in particular configurations) that may store the one or more selected image data pieces, and the MFP 200 may perform printing based on the one or more image data pieces downloaded from the image server 100. Hereinafter, the printing performed in accordance with the above-described procedure may be referred to as "download printing."

A general configuration of the MFP 200 now is described. As shown in FIG. 1, the MFP 200 may comprise a central processing device ("CPU") 31 (an example of a control device), a read-only memory ("ROM") 32, a random-access memory ("RAM") 33 (an example of a storage device), and a nonvolatile RAM ("NVRAM") 34. Further, the MFP 200 may comprise an image forming device 10 (as an example of a printing device), an image reading device 11, an operation panel 40 (an example of an accepting device and an example of a display device), and a network interface ("I/F") 37, which may be controlled by the CPU 31. The image forming device 10 may be configured to print an image onto a recording medium (e.g., a sheet). The image reading device 11 may be configured to read an image from a document. The operation panel 40 may be configured to display operating statuses and to accept an input operation.

The image forming device 10 may be configured to perform one or more of color printing and monochrome printing. In particular configurations, the image forming device 10 may perform the color printing, for example. Further, the image forming device 10 may be configured to perform printing by using one or more of an electrophotographic method and an inkjet method. The image reading device 11 may be configured to perform one or more of color scanning and monochrome scanning. In particular configurations, the image reading device 11 may perform color scanning, for example. A scanning mechanism may adopt one or more of a charge-coupled device ("CCD") and a contact image sensor ("CIS").

The ROM 32 may be configured to store various settings and firmware such as various control programs (e.g., computer-readable instructions) for controlling the MFP 200 (e.g., instructing CPU 31 to perform or control certain processes), as well as certain initial values. The RAM 33 and the NVRAM 34 may be used as one or more of workspaces, respectively, for temporarily storing the control programs read from the ROM 32 and storage areas, respectively, for temporarily storing data.

The CPU 31 may store processing results in the RAM 33 or the NVRAM 34, in response to one or more of executing various programs read from the ROM 32, executing the programs read from the NVRAM 34, and receiving signals sent from sensors.

The network I/F 37 may enable the MFP 200 to perform communication with another device. The MFP 200 may, for example, transmit an image data request to the image server 100 and receive an image data piece from the image server 100, via the network I/F 37.

The operation panel 40 may be disposed at the exterior of the MFP 200 and comprise one or more buttons (e.g., physical buttons and switches, virtual buttons and switches, or some combination thereof) for accepting inputs and a touch panel for displaying messages and details of settings. The various buttons may comprise, for example, an OK button, a cancel button, and numeric keys. The touch panel may be configured to enable a tactile interface for various inputs, such as, for example, inputs of one or more of the print settings and a personal identification number.

A general configuration of the image server 100 now is described. As shown in FIG. 1, the image server 100 may comprise a CPU 51, a ROM 52, a RAM 53, and a hard disk drive ("HDD") 54. The image server 100 may comprise a network interface (I/F") 57 that may be configured to enable the image server 100 to perform communication with an external device.

The HDD 54 of the image server 100 may store one or more of an operating system ("OS"), browsers for browsing data on the Internet, and device drivers for controlling various devices. The HDD 54 may also store at least one image data piece. The image data piece stored in the HDD 54 may be a file in a common image format, such as, for example, one or more of PDF (an abbreviation for portable document format) format, JPEG (an abbreviation for Joint Photographic Experts Group) format, GIF (an abbreviation for Graphics Interchange Format) format, or bitmap format. The HDD 54, may also store a thumbnail image of the potential image data piece in addition to the image data piece itself, which may be a potential print target.

The CPU 51 may store processing results in one or more of the RAM 53 and the HDD 54 in response to executing various control programs read from one or more of the ROM 52 and the HDD 54.

Similar to the network I/F 37 of the MFP 200, the network I/F 57 may be configured to enable the image server 100 to perform communication with another device. The image server 100 may, for example, transmit an image data piece to the MFP 200, via the network I/F 57.

Further, the image server 100 may be configured to generate a transformed data piece based on an image data piece by transforming the image data piece in accordance with a predetermined transformation condition. The image server 100 according to particular configurations may be configured to transform a size of an image data piece to fit its height and width in a predetermined size. The height and width of the image data piece may be specified as transformation conditions for such a size transforming function.

The management server 300 may be configured similarly to the image server 100 and may comprise one or more of a CPU 61, a ROM 62, a RAM 63, a HDD 64, and a network interface ("I/F") 67.

The HDD 64 of the management server 300 may store a uniform resource locator ("URL") of the image data piece stored in the image server 100 and a URL of the thumbnail image of the image data piece. In other configurations, for example, the HDD 64 may store information about an image data piece stored in another image server other than the image server 100.

Figure 2:
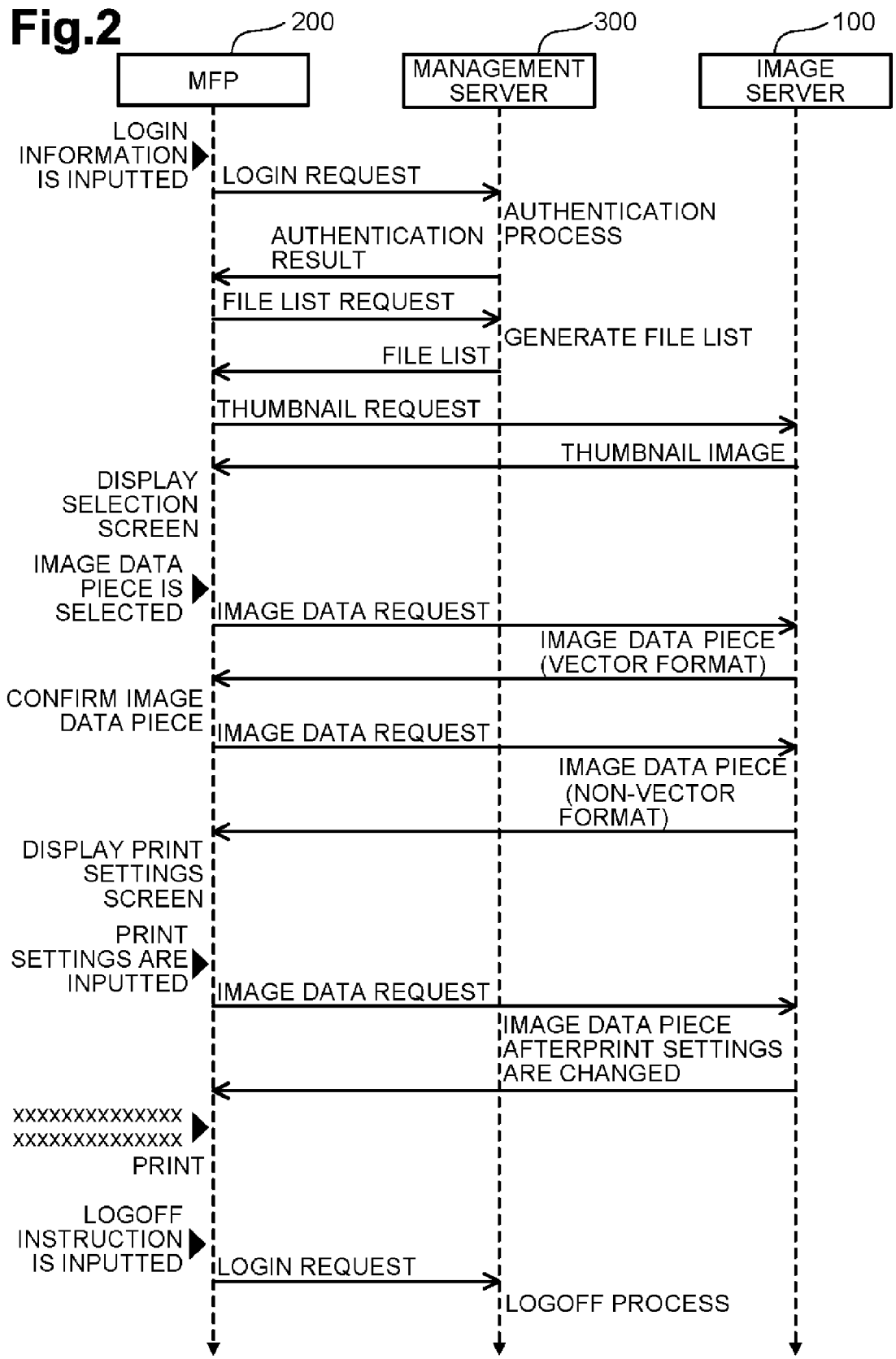
FIG. 2 is a sequence diagram showing a process for data communication performed by each of a multifunction peripheral ("MFP"), an image server, and a management server during a process of download printing.

A detailed procedure of download printing performed in the image forming system 900 now is described with reference to a sequence diagram shown in FIG. 2.

In the download printing, the MFP 200 may accept an input of login information. The login information may be personal information necessary to log in to the management server 300, and may comprise, for example, an identifier and a password associated with a particular identity. The login information may be input by an operation through the operation panel 40, for example.

In response to the login information being input, the MFP 200 may transmit a request for permission to log in (hereinafter, referred to as "a login request") to the management server 300. The input login information may be added to the login request. In response to receipt of the login information, the management server 300 may perform an authentication process. Thereafter, the management server 300 may transmit an authentication result to the MFP 200 as a response. In particular configurations described below, merely to facilitate the description of such configurations, it may be assumed that the login is authenticated in the authentication process.

When the login is authenticated, the MFP 200 may transmit a file list request for transmission of a file list, which may store a list of one or more image data pieces that a logged-in identity with permission to access the management server 300 may print. The file list request may comprise, for example, the information for identifying the logged-in identity.

The management server 300 may generate a file list for the logged-in identity in response to the file list request made by the MFP 200 and may transmit the file list to the MFP 200 as a response. The file list may store one or more URLs of the one or more image data pieces and one or more URLs of their (e.g., the one or more image data pieces) thumbnail images, for example.

Figure 3:
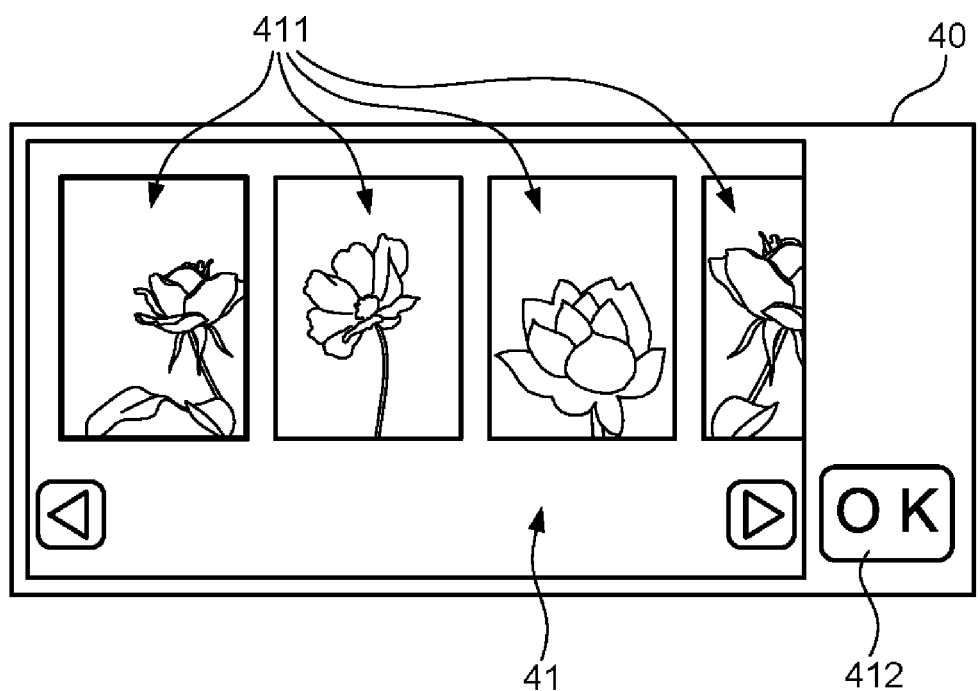
FIG. 3 shows an example file selection screen displayed on the MFP.

In response to receipt of the file list, the MFP 200 may display a selection screen on the operation panel 40. The selection screen may be configured to display the list of the one or more image data pieces that may be printed by the logged-in identity and may allow the identity to select one or more image data pieces to be printed therefrom. FIG. 3 shows an example configuration of a selection screen 41 displayed on the operation panel 40. In particular configurations, for example, thumbnail images may be acquired based on the URLs of the thumbnail images stored in the file list, and the acquired thumbnail images 411 may be displayed on the selection screen 41. Thereafter, one of the thumbnail images 411 may be selected (e.g., touched). Thus, an outline of the selected thumbnail image 411 may be emphasized and the image data piece corresponding to the selected thumbnail image 411 may be in a selected state. When the image data piece is selected (e.g., touched) again while in the selected state, the outline of the touched thumbnail image 411 may be returned to a normal indication, and thus the image data piece may be in an unselected state. When an "OK" button 412 is selected (e.g., touched) while an image data piece is selected, the selected image data piece may be confirmed as a print target.

When an image data piece is in the selected state, the MFP 200 may transmit an image data request for transmission of the selected image data piece to the image server 100, as appropriate. In particular configurations, when the selected image data piece is in vector format, the MFP 200 may start downloading the selected image data piece.

In response to receipt of the image data request, the image server 100 may retrieve the selected image data piece from the HDD 54 and may transmit the retrieved image data piece to the MFP 200. Thereafter, the MFP 200 may store the received image data piece in the RAM 33. Thus, in some configurations, for example, the MFP 200 might not immediately start printing of the received image data piece.

When the one or more selected image data pieces include one or more image data pieces of which downloading has not yet been started (e.g., the image data piece in a format other than vector format), the MFP 200 may transmit to the image server 100 an image data request for transmission of the one or more yet-to-be downloaded image data pieces when the one or more selected image data pieces are confirmed as print targets.

Figure 4:
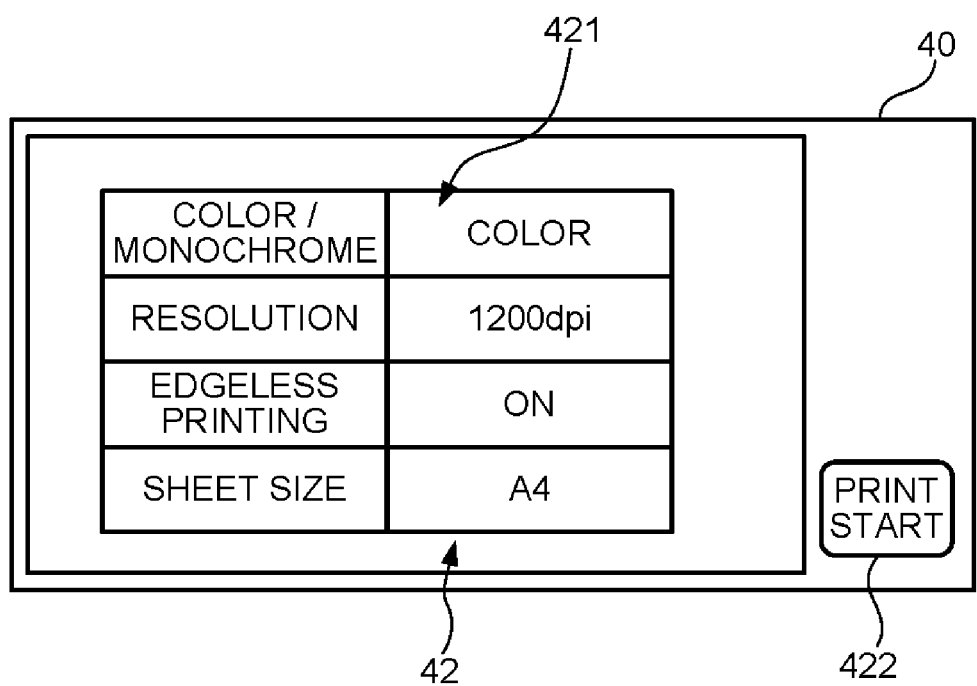
FIG. 4 shows an example print settings screen displayed on the MFP.

In response to the one or more selected image data pieces being confirmed as the print targets, the MFP 200 may display on the operation panel 40 a print settings screen for changing the print settings. FIG. 4 shows an example configuration of a print settings screen 42 displayed on the operation panel 40. Initial settings for the print settings may be initially displayed on the print settings screen 42. On the print settings screen 42, selection (e.g., touch) of a field 421 of a desired one of the setting items may change the setting item to another option. For example, in response to a touch, the print settings screen 42 may display one or more options in another window or in a pull-down menu to accept a new option for the print settings. When the print settings are changed, the MFP 200 may transmit to the image server 100 another image data request for the transmission of the one or more selected image data pieces, depending on the details of the changes in the print settings.

When the specification of the print settings is completed, a print execution instruction may be input to the MFP 200 by when a "PRINT START" button 422 is selected (e.g., touched). In response to the input of the print execution instruction, the MFP 200 may start printing of the one or more downloaded image data pieces.

Thereafter, the MFP 200 may accept an input of a logoff instruction. When the MFP 200 accepts the logoff instruction, the MFP 200 may transmit a request for permission to log off (hereinafter, referred to as a "logoff request") to the management server 300. When the management server 300 accepts the logoff request, the management server 300 may perform a logoff process. A completion of the logoff process may complete the download printing.

A download printing process performed by the MFP 200 to implement the above-described download printing now is described with reference to flowcharts shown in FIGS. 5, 6, and 7. The download printing process may be performed by the CPU 31 when login information is input to the MFP 200. The sequence diagram shown in FIG. 2 shows main operations that may be performed to implement the download printing. Therefore, the transmission and reception of data pieces (not shown in FIG. 2) that may be performed to implement the download printing are included in more detail in the flowcharts in FIGS. 5, 6, and 7, which show specific processing performed by the MFP 200.

Figure 5:
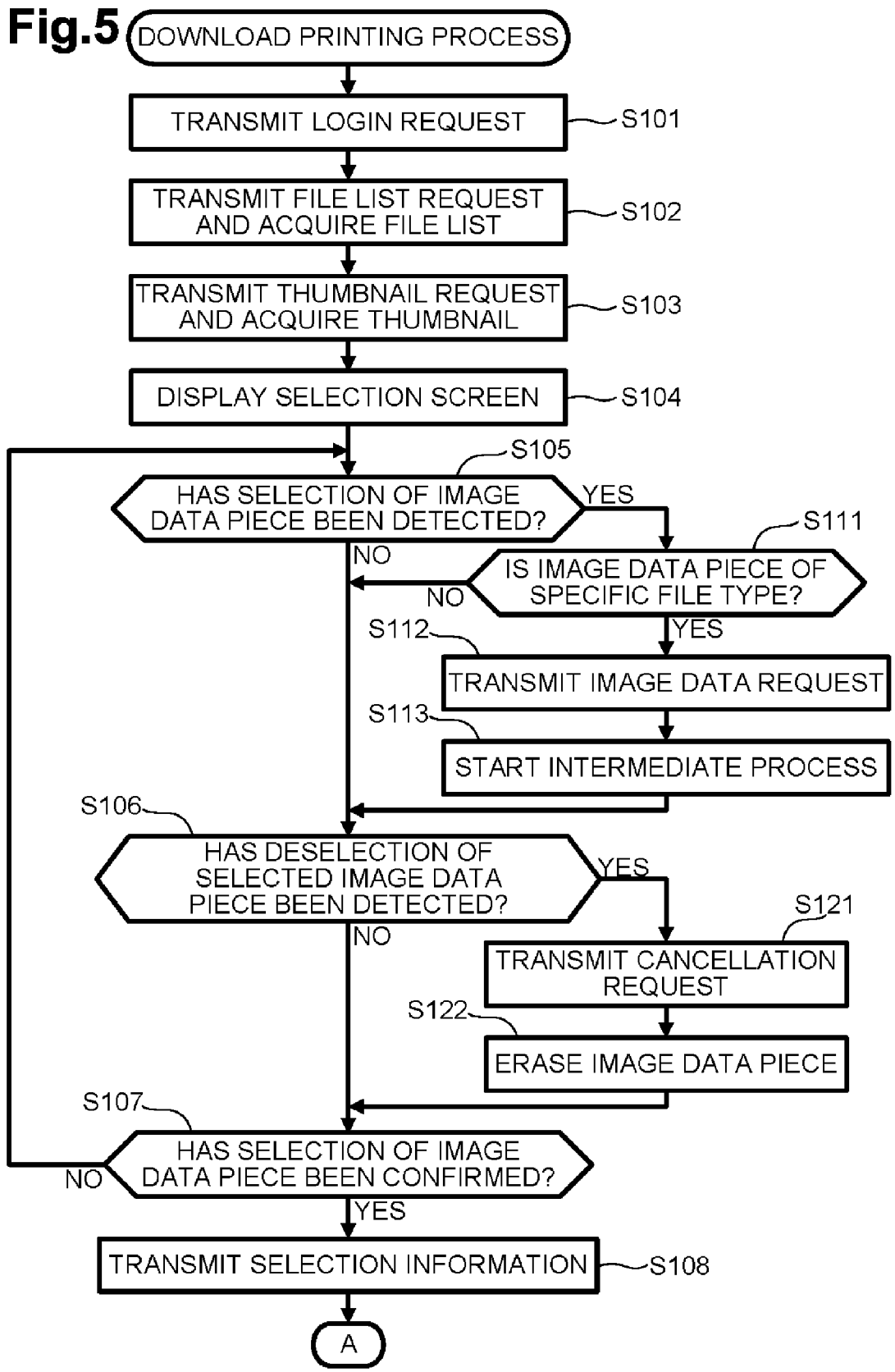
FIG. 5 is a flowchart showing an initial portion of an example download printing process performed by the MFP.

In the download printing process, as shown in FIG. 5, the CPU 31 may transmit a login request, to the management server 300 (e.g., step S101). Subsequent to step S101, the CPU 31 may transmit a file list request to the management server 300 when the CPU 31 has acquired an authentication result from the management server 300 and the login is authenticated (e.g., step S102). When the login is not authenticated, the CPU 31 may end the download printing process (not shown). In step S102, the CPU 31 may acquire a file list from the management server 300. The CPU 31 may acquire a list of URLs of one or more image data pieces and URLs of their (e.g., the one or more image data pieces) thumbnail images through the acquisition of the file list.

Subsequent to step S102, the CPU 31 may transmit a thumbnail request for transmission of the one or more thumbnail images from the image server 100 that may store the one or more thumbnail images. The thumbnail request may include a reference to each URL of the one or more thumbnail images in the file list (e.g., step S103). Thereafter, the CPU 31 may acquire the one or more thumbnail images from the image server 100. Subsequent to step S103, the CPU 31 may display the selection screen 41 on the operation panel 40 (e.g., step S104). The CPU 31 may display the one or more thumbnail images acquired in step S103 on the selection screen 41.

Subsequent to step S104, the CPU 31 may determine whether a selection of an image data piece has been detected (e.g., step S105). That is, the CPU 31 may determine, for example, whether a touch of an image data piece in the unselected state has been detected. When the CPU 31 determines that the selection of an image data piece has not been detected (e.g., NO in step S105), the CPU 31 may determine whether a deselection of a selected image data piece has been detected (e.g., step S106). That is, the CPU 31 may determine, for example, whether a touch of an image data piece in the selected state has been detected. When the CPU 31 determines that a deselection of a selected image data piece has not been detected (e.g., NO in step S106), the CPU 31 may determine whether the selection of the image data piece has been confirmed (e.g., step S107). That is, the CPU 31 may determine, for example, whether a touch of the "OK" button 412 has been detected while an image data piece is selected. When the CPU 31 determines that the selection of the image data piece has not been confirmed (e.g., NO in step S107), the routine may proceed to step S105 and wait until the CPU 31 determines that an operation on one or more of the operation panel 40 and the selection screen 41 has been detected.

When the CPU 31 determines that the selection of an image data piece has been detected (e.g., YES in step S105), the CPU 31 may determine whether the selected image data piece is a specific file type (e.g., step S111). In particular configurations, an image file in vector format may be the specific file type. For example, it may be determined, for example, based on an expansion of a file name stored in the URL of the image data piece, whether the selected image data piece is a file in vector format. The file in vector format may require an intermediate process in which an intermediate data piece for rasterization may be generated before performing a rasterization process for generating an image data piece for printing. Therefore, as compared with a file in bitmap format, which might not require the intermediate process, it may be useful to acquire the file in vector format at an earlier timing, such that the intermediate process may be performed on the file in vector format earlier in the download printing process. The intermediate process might not depend on the print settings, such as, for example, one or more of a resolution and color settings, and may be performed before or after the print settings are confirmed.

When the CPU 31 determines that the selected image data piece is the specific file type (e.g., YES in step S111), the CPU 31 may transmit an image data request to the image server 100, which may store the selected image data piece (e.g., step S112). A file name of the selected image data piece may be added to the image data request transmitted in step S112, however, a parameter that may be a transformation condition of the image data piece might not be added to the image data request in some configurations. Thus, in some configurations, the selected image data piece may be downloaded without being transformed in accordance with the image data request.

Subsequent to step S112, the CPU 31 may receive the image data piece transmitted from the image server 100 and may perform the intermediate process on the received image data piece (e.g., step S113). Subsequent to step S113, the routine may proceed to step S106. When the CPU 31 determines that the selected image data piece is not the specific file type (e.g., NO in step S111), the CPU 31 might not transmit an image data request and the routine may proceed to step S106.

When the CPU 31 determines that a deselection of a selected image data piece has been detected (e.g., YES in step S106), the CPU 31 may transmit a cancellation request to cancel the downloading of the deselected image data piece to the image server 100 (e.g., step S121). Thus, the downloading of the deselected image data piece may be cancelled. Thereafter, the CPU 31 may cancel the intermediate process and erase from the local memory (e.g., delete permanently, enable overwriting thereof, flag for deletion, overwrite, identify as free space, remove from the local memory) the received image data piece and the intermediate data piece generated through the intermediate process (e.g., step S122). Subsequent to step S122, the routine may proceed to step S107.

When the CPU 31 determines that the selection of the image data piece has been confirmed (e.g., YES in step S107), the CPU 31 may determine the one or more image data pieces in the selected state as print targets and may transmit information about the one or more selected image data pieces (hereinafter, referred to as "selection information") to the management server 300 (e.g., step S108). More specifically, in step S108, the CPU 31 may transmit, for example, a file name of each of the one or more selected image data pieces as the selection information. As receipt of the selection information, the management server 300 may transmit, as a response, the setting items and default settings that may be important for the MFP 200 to display the print settings screen 42. Further, the management server 300 may determine an appropriate image size for the one or more image data pieces (e.g., a sufficient image size) based on the default settings and may transmit to the MFP 200, as a response, the appropriate image size.

Figure 6:
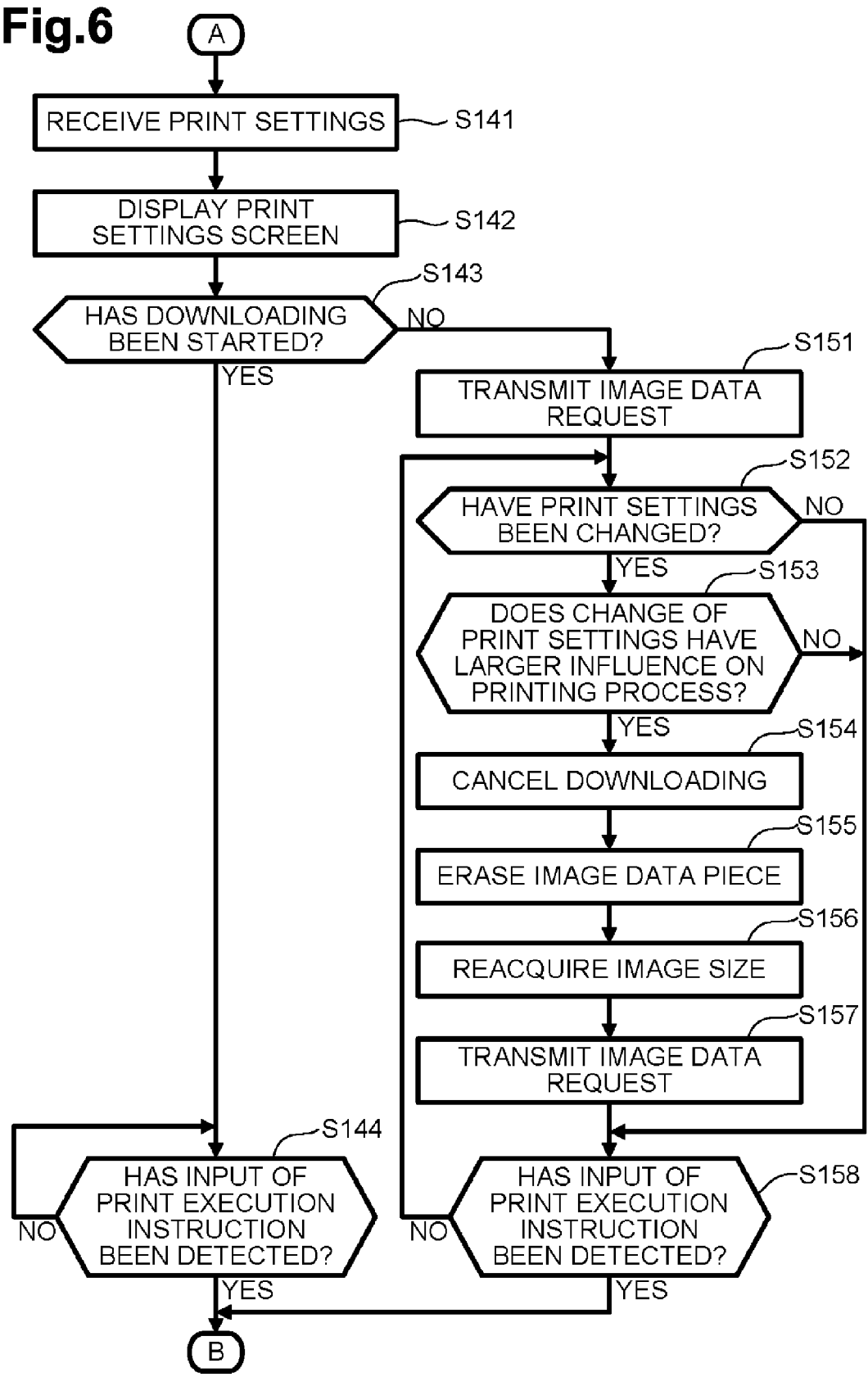
FIG. 6 is a flowchart showing a further portion of the download printing process performed by the MFP in FIG. 5.

Subsequent to step S108 in the flowchart in FIG. 5, the CPU 31 may receive from the management server 300 the setting items and default settings that may be appropriate for the print settings (e.g., step S141 shown in FIG. 6). When the MFP 200 stores the setting items and the default settings therein, the CPU 31 might not need to receive the setting items and the default settings from the management server 300. The CPU 31 may display the print settings screen 42 on the operation panel 40 based on the received setting items and default settings (e.g., step S142).

Subsequent to step S142, the CPU 31 may determine whether the downloading of all of the one or more selected image data pieces has been started (e.g., step S143). In particular configurations, when all of the one or more selected image data pieces are image files in vector format, the CPU 31 may have already transmitted an image data request in step S112, and the CPU 31 may determine that the downloading of all of the one or more selected image data pieces has been started. When the CPU 31 determines that the downloading of all of the one or more selected image data pieces has been started (e.g., YES in step S143), the CPU 31 may determine whether an input of a print execution instruction has been detected (e.g., step S144). That is, the CPU 31 may determine, for example, whether a touch of the "PRINT START" button 422 has been detected. When the CPU 31 determines that an input of the print execution instruction has not been detected (e.g., NO in step S144), the routine may wait until the CPU 31 determines that an input of the print execution instruction has been detected.

When the CPU 31 determines that there are one or more image data pieces for which the downloading has not been started (e.g., NO in step S143), the CPU 31 may transmit an image data request to the image server 100, which may store the one or more yet-to-be downloaded image data pieces (e.g., step S151). A parameter that may be a transformation condition may be added to the image data request transmitted in step S151, as well as each of the file names of the one or more image data pieces. In particular configurations, the appropriate image size acquired from the management server 300 may be added to the image data request as the parameter. Therefore, the image server 100 that has received the image data request may transform the one or more image data pieces in accordance with the parameter. Thereafter, the MFP 200 may start the downloading of the one or more image data pieces transformed by the image server 100.

Subsequent to step S151, the CPU 31 may determine whether the change of the print settings has been detected (e.g., step S152). When the CPU 31 determines that the change of the print settings has not been detected (e.g., NO in step S152), in a manner similar to step S144, the CPU 31 may determine whether an input of a print execution instruction has been detected (e.g., step S158). When the CPU 31 determines that an input of the print execution instruction has not been detected (e.g., NO in step S158), the routine may proceed to step S152, and the routine may wait until the CPU 31 determines that an operation on the print settings screen 42 has been detected.

When the CPU 31 determines that the change of the print settings has been detected (e.g., YES in step S152), the CPU 31 may determine whether the change of the print settings has a significant influence on a printing process (e.g., step S153). More specifically, in particular configurations, the CPU 31 may determine whether the change of the print settings requires an increase of the appropriate (e.g., sufficient) image size (e.g., has a significant influence on the printing process). In particular configurations, the appropriate image size may be added to the image data request as the parameter that may be the transformation condition. The appropriate image size may vary depending on the sheet size and the resolution.

For example, a correspondence between the print settings and the appropriate image size in the MFP 200 is shown in FIG. 8. A maximum width of image widths obtained by setting item of the print settings may be determined as the appropriate image size. An image height may be set to scale at unity magnification of the image width (e.g., an aspect ratio of the image may remain constant). For example, when the resolution is medium level and the sheet size is A4 size for the default settings specified in the management server 300, an image width obtained based on the resolution may be 600 pixels and an image width obtained based on the sheet size may be 600 pixels. Thus, 600 pixels, which may be a maximum value of the image widths, may be determined as the appropriate image size in the default settings. The management server 300 may comprise a database that may store the correspondence between the print settings and the appropriate image size, as shown in FIG. 8, and may be configured to determine the default settings to further determine the appropriate image size in correspondence with the default settings. The MFP 200 may receive the appropriate image size in the default settings in step S141 when displaying the print settings screen 42.

As shown in FIG. 8, as the resolution increases, the appropriate image size may become greater. As the sheet size increases, the appropriate image size may become greater. Therefore, the change of the resolution to a higher level may increase the appropriate image size. The change of the sheet size to a larger size may also increase the appropriate image size. Thus, the MFP 200 may determine that such changes have greater influence on the printing process. Conversely, the change of the resolution to a lower level and the change of the sheet size to a smaller size may both reduce the appropriate image size. Accordingly, although such changes to the print settings may be made, the appropriate image size associated with the pre-change print settings may be sufficient to respond to the changes and also may be appropriate for the post-change print settings. Consequently, the MFP 200 may determine that such changes have less influence on the printing process.

When the CPU 31 determines that the change of the print settings has greater influence on the printing process (e.g., when there is a possibility that the original appropriate image size may not adequately respond to the change) (e.g., YES in step S153), the CPU 31 may transmit a cancellation request to cancel the downloading to the image server 100 (e.g., step S154). Further, the CPU 31 may erase the one or more received image data pieces (e.g., step S155) from the local memory.

Thereafter, the CPU 31 may acquire the appropriate image size based on the changed print settings (e.g., step S156). That is, the CPU 31 may transmit to the management server 300, as the change information, the changed print settings and may receive from the management server 300 the appropriate image size based on the changed print settings.

Subsequent to step S156, the CPU 31 may transmit an image data request to the image server 100, which may store the one or more selected image data pieces (e.g., step S157). The appropriate image size acquired (e.g., reacquired) in step S156 as the parameter may be added to the image data request transmitted in step S157 in addition to the file names of the one or more selected image data pieces. Thus, the downloading of the one or more selected image data pieces may be started again. Subsequent to step S157, the routine may proceed to step S158.

When the CPU 31 determines that the change of the print setting has less influence on the printing process (e.g., when the original appropriate image size adequately responds to the change) (e.g., NO in step S153), the downloading might not need to be requested again. Nevertheless, it may be beneficial to reduce a load associated with reacquiring the one or more image data pieces. Therefore, the routine may proceed to step S158 without performing the processing in steps S154 to S157.

Figure 7:
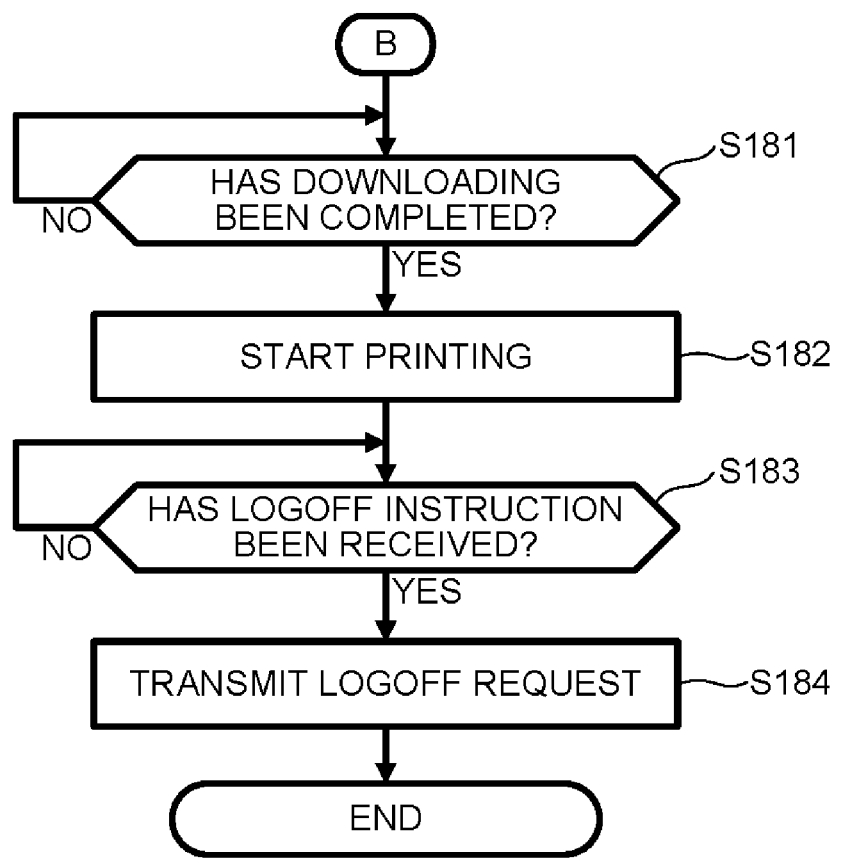
FIG. 7 is a flowchart showing an additional portion of the download printing process performed by the MFP in FIG. 6.

When the CPU 31 determines that the input of a print execution instruction has been detected (e.g., step S144 or YES in step S158), as shown in the flowchart in FIG. 7, the CPU 31 may determine whether the downloading of all of the one or more image data pieces has been completed (e.g., step S181). When the CPU 31 determines that the downloading of all of the one or more image data pieces has not been completed (e.g., NO in step S181), the routine may wait until the CPU 31 determines that the downloading of all of the one or more image data pieces has been completed.

When the CPU 31 determines that the downloading of all of the one or more image data pieces has been completed (e.g., YES in step S181), the CPU 31 may perform a rasterization process on the one or more received image data pieces or the one or more intermediate data pieces generated based on the one or more received image data pieces and start printing using the image forming device 10 (e.g., step S182). It may be unnecessary to wait until all of the one or more image data pieces are received to start the printing. Printing may be started after a certain amount of image data (e.g., a sufficient amount of image data to perform printing) has been received.

Subsequent to step S182, the CPU 31 may determine whether an input of a logoff instruction has been detected (e.g., step S183). When the CPU 31 determines that an input of a logoff instruction has not been detected (e.g., NO in step S183), the routine may wait until the CPU 31 determines that an input of a logoff instruction has been detected. When the CPU 31 determines that an input of a logoff instruction has been detected (e.g., YES in step S183), the CPU 31 may transmit a logoff request to the management server 300 (e.g., step S184). Subsequent to step S184, the CPU 31 may end the download printing process.

Figure 9:
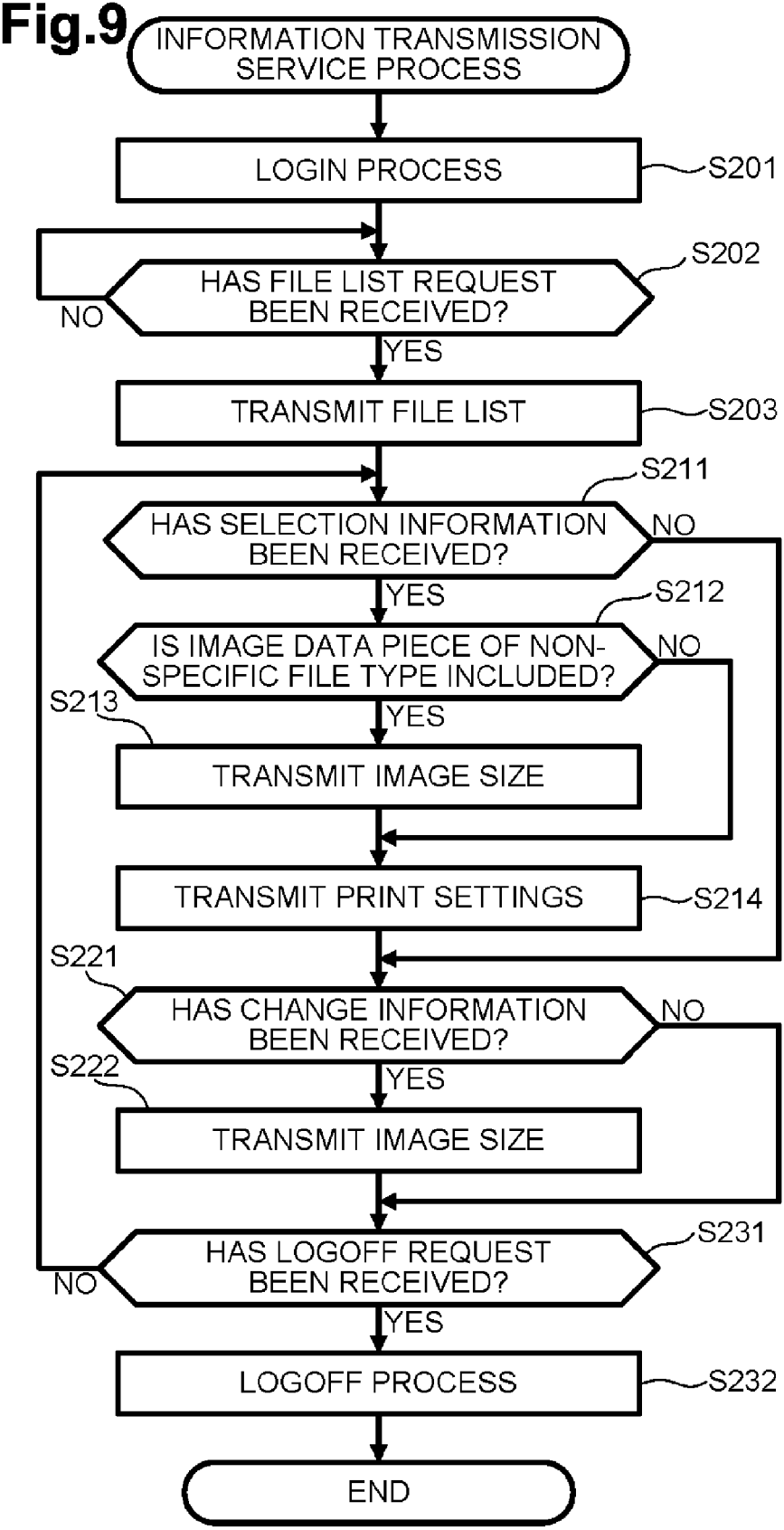
FIG. 9 is a flowchart showing an example information transmission service process performed by the management server.

An information transmission service process performed by the management server 300 to implement the above-described download printing now is described with reference to FIG. 9. The information transmission service process may be performed by the CPU 61 when the CPU 61 has accepted a login request. In the description below, merely for the purpose of facilitating such description, it may be assumed that the CPU 61 has already accepted a login request transmitted from the MFP 200.

In the information transmission service process, the CPU 61 may perform a login process (e.g., step S201). More specifically, the CPU 61 may perform an authentication process based on login information included in the login request and may transmit an authentication result to the MFP 200. In the description below, merely for the purpose of facilitating such description, it may be assumed that the identity is authenticated in the authentication process. When the identity is not authenticated, the CPU 61 may end the information transmission service process (not shown).

Subsequent to step S201, the CPU 61 may determine whether a file list request has been received from the MFP 200 (e.g., step S202). When the CPU 61 determines that a file list request has not been received (e.g., NO in step S202), the routine may wait until the CPU 61 determines that a file list request has been received. When the CPU 61 determines that a file list request has been received (e.g., YES in step S202), the CPU 61 may select one or more image data pieces, all of which the identity identified by the information included in the file list request may be authorized to print (e.g., the identity may be authorized to log in and access), to be used to generate a file list that may store URLs of one or more thumbnail images of the one or more selected image data pieces, and the CPU 61 may transmit the file list to the MFP 200 (e.g., step S203).

Subsequent to step S203, the CPU 61 may determine whether selection information has been received from the MFP 200 (e.g., step S211). The selection information may be transmitted from the MFP 200 in step S108 after one or more print-target image data pieces are determined. When the CPU 61 determines that selection information has been received (e.g., YES in step S211), the CPU 61 may determine whether the one or more selected image data pieces include an image data piece of a nonspecific file type that is different from the specific file type (e.g., step S212). The specific file type at this point may be similar to the specific file type identified in the description of step S111 above. In particular configurations, for example, an image data piece in a format other than the vector format (e.g., an image data piece in bitmap format) may be determined to be an image data piece of the nonspecific file type.

When the CPU 61 determines that the one or more selected image data pieces include an image data piece of the nonspecific file type (e.g., YES in step S212), the CPU 61 may transmit to the MFP 200 an appropriate image size based on the default settings of the print settings (e.g., step S213). Thereafter, the CPU 61 may transmit definable setting items of the print settings and the default settings of the print settings to the MFP 200 (e.g., step S214). The processing in step S213 and the processing in step S214 may be performed in a reverse order in some configurations. When the CPU 61 determines that the one or more selected image data pieces do not include an image data piece of the nonspecific file type (e.g., NO in step S212), the CPU 61 may transmit to the MFP 200 the definable setting items of the print settings and the default settings of the print settings without transmitting an appropriate image size (e.g., step S214).

Subsequent to step S214, or when the CPU 61 determines that selection information has not been received (e.g., NO in step S211), the CPU 61 may determine whether change information has been received (e.g., step S221). The change information may be transmitted from the MFP 200 in step S156 after the print settings are changed. When the CPU 61 determines that change information has been received (e.g., YES in step S221), the CPU 61 may transmit an appropriate image size based on the changed print settings stored in the change information to the MFP 200 (e.g., step S222).

Subsequent to step S222, or when the CPU 61 determines that change information has not been received (e.g., NO in step S221), the CPU 61 may determine whether a logoff request has been received from the MFP 200 (e.g., step S231). When the CPU 61 determines that a logoff request has not been received (e.g., NO in step S231), the routine may proceed to step S211 and wait until the CPU 61 determines that a logoff request has been received from the MFP 200. When the CPU 61 determines that a logoff request has been received (e.g., YES in step S231), the CPU 61 may perform a logoff process (e.g., step S232). Subsequent to step S232, the CPU 61 may end the information transmission service process.

Figure 10:
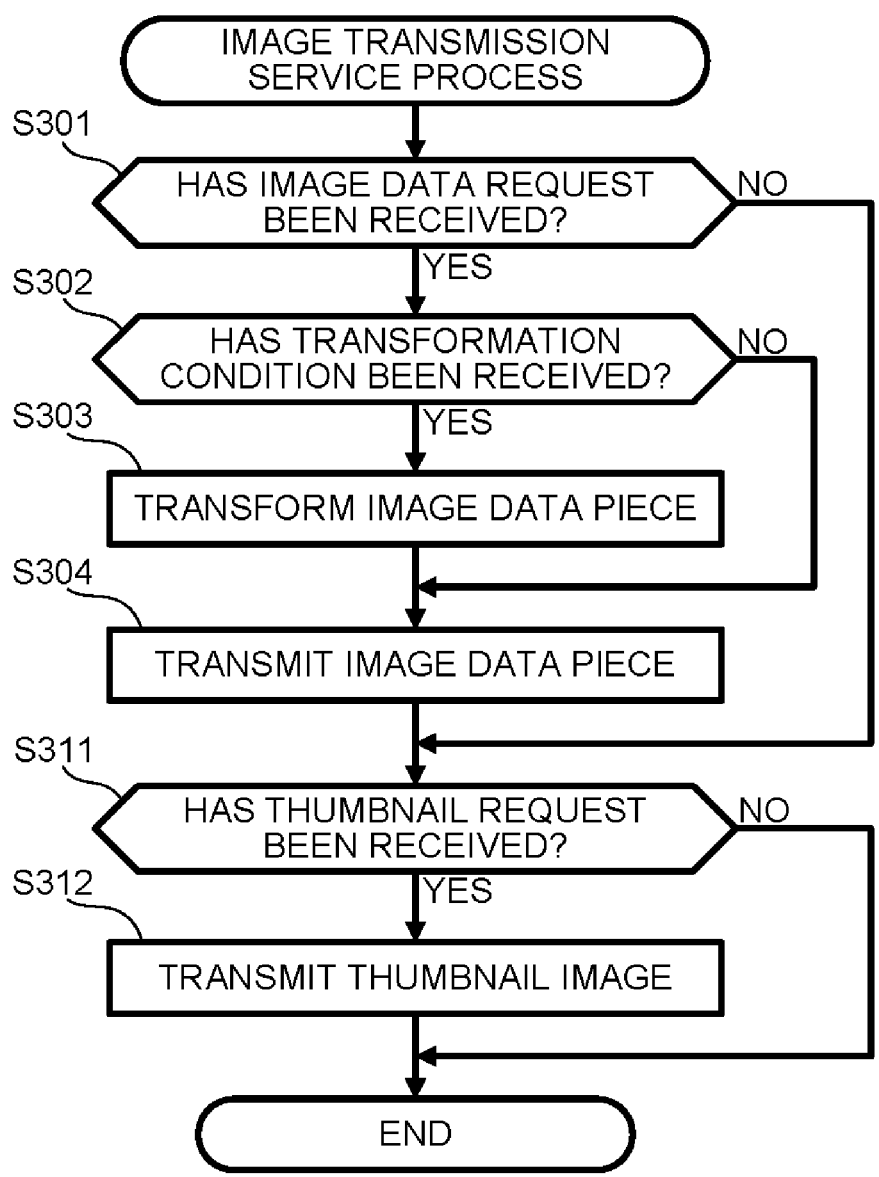
FIG. 10 is a flowchart showing an example image transmission service process performed by the image server.

An image transmission service process performed by the image server 100 to implement the above-described download printing now is described with reference to FIG. 10. The image transmission service process may be performed by the CPU 51 at regular intervals (e.g., every one second).

In the image transmission service process, the CPU 51 may determine whether an image data request has been received (e.g., NO in step S301). When the CPU 51 determines that an image data request has been received (e.g., YES in step S301), the CPU 51 may determine whether a parameter that may be a transformation condition is included in the image data request (e.g., step S302).

When the CPU 51 determines that a transformation condition is included (e.g., YES in step S302), the CPU 51 may generate, for the one or more selected image data pieces that may be required to be downloaded, one or more image data pieces transformed in accordance with the transformation condition (e.g., step S303). In particular configurations, the parameter related to the appropriate image size may be added to each image data piece that is not an image data piece in vector format (e.g., an image data piece in bitmap format). The CPU 51 may transform the one or more image data pieces to fit in the appropriate image size.

Subsequent to step S303, the CPU 51 may transmit the one or more transformed image data pieces to a requester that provided the image data request (e.g., step S304). When the CPU 51 determines that a transformation condition is not included (e.g., NO in step S302), the CPU 51 may transmit to the requester the one or more image data pieces that may be required to be downloaded, without transforming the one or more image data pieces (e.g., step S304).

Subsequent to step S304, or when the CPU 51 determines that an image data request has not been received (e.g., NO in step S301), the CPU 51 may determine whether a thumbnail request has been received (e.g., step S311). When the CPU 51 determines that a thumbnail request has been received (e.g., YES in step S311), the CPU 51 may transmit one or more requested thumbnail images to a requester that provided the thumbnail request (e.g., step S312). Subsequent to step S312, or when the CPU 51 determines that a thumbnail request has not been received (e.g., NO in step S312), the CPU 51 may end the image transmission service process.

As described above, in the MFP 200 according to particular configurations, the downloading of the image data piece may be started when the image data piece is selected on the selection screen 41 or when the print settings are changed on the print settings screen 42. Therefore, the downloading of the image data piece may be started before the print execution instruction is input through the "PRINT START" button 422. Thus, in particular configurations, the downloading of the image data piece may be started earlier than in a configuration in which the downloading of the image data piece is started after the print execution instruction is input. Consequently, the time required to complete the printing process may be reduced.

While the disclosure has been described in detail with reference to particular configurations thereof, such configurations are merely examples, and various changes, arrangements, and modifications may be applied to such configurations without departing from the spirit and scope of the disclosure. In other configurations, for example, the image forming apparatus may be a device that may have an image forming function, such as, for example, one or more of a copying machine, a printer, and a facsimile machine, in addition to or in place of a multifunction peripheral, such as, for example, the MFP 200.

In particular configurations, the appropriate image size may be determined based on the resolution and the sheet size. Nevertheless, the print settings used for the determination of the appropriate image size are not limited to such configurations. In other configurations, for example, the appropriate image size may be determined based on whether color printing or monochrome printing.

In particular configurations, when the print settings are changed, the downloading of the image data piece might not be performed again, depending on the details of the change in the print settings. Nevertheless, in other configurations, for example, the downloading of the image data piece may be performed again every time the print settings are changed, regardless of the details of the change in the print settings.

The image server 100 according to particular configurations may be configured to transform the image size to the predetermined size in the transformation process. Nevertheless, the transformation process might not be limited to such configurations. In other configurations, for example, the image server 100 may be configured to transform a color image into a monochrome image. The image server 100 may be configured to transform an image data piece in vector format into an image data piece in bitmap format, for example, as part of another transforming function. In such configurations, for example, the identification of the specific file type performed in the configurations described above might not need to be performed, and all the image data pieces may be handled as the image data pieces in bitmap format. That is, an image data request may not be transmitted in step S112 at the time of the selection of an image data piece on the selection screen 41. When an image data piece in vector format is selected, a parameter to transform an image data piece in vector format to an image data piece in bitmap format may be included in the image data request transmitted in step S151.

In particular configurations, the logging in or off from the management server 300 may be performed during the download printing. Nevertheless, it may only be important to confirm (e.g., recognize, identify) the identity. Therefore, in other configurations, for example, the login process and the logoff process might not be performed. That is, a file list request may be made after information regarding the identity is input, and such information may be included in the file list request.

In particular configurations, the identity may be identified, and thereafter, a file list of the one or more image data pieces, which the identity may be authorized to print, may be generated. Nevertheless, it may be unnecessary to identify the user. In other configurations, for example, the one or more of the processes of logging on the identity and logging off the identity might not be needed. Consequently, the information regarding the identity might not be added to the file list request, and the management server 300 may generate a file list of one or more image data pieces that may be transmittable to the MFP 200, without the limitation by the identity.

In particular configurations, when the downloading of the image data piece has been started and the thumbnail image 411 corresponding to the image data piece being downloaded is changed from the selected state to the unselected state on the selection screen 41, the ongoing downloading of the image data piece may be cancelled and the one or more downloaded data pieces may be erased. Nevertheless, in other configurations, for example, similar to this, the ongoing downloading of the image data piece may be cancelled and the one or more downloaded data pieces may be erased when all of the operations for download printing are cancelled after shifting to the print settings screen 42. That is, when the printing of the image data piece is cancelled at a time after the downloading of the image data piece is started, the downloaded image data piece may be erased.

In particular configurations, the management server 300, which may provide a file list, and the image server 100, which may provide an image data piece, may be provided independently. Nevertheless, in other configurations, the management server 300 and the image server 100 may be implemented by a single server. In such configurations, a request to provide a file list may be transmitted to a server, which may provide an image data piece.

In particular configurations, an image data request may be made when an image data piece is selected on the selection screen 41 and when the print settings are changed on the print settings screen 42. Nevertheless, it may be unnecessary to make an image data request when an image data piece is selected on the selection screen 41 and when the print settings are changed on the print settings screen 42. In other configurations, for example, an image data request may be made when an image data piece is selected on the selection screen 41 or when the print settings are changed on the print settings screen 42. In such configurations, for example, the downloading of the image data piece may be started at an earlier timing.

The processes disclosed in the above-described configurations may be performed by a single CPU, a plurality of CPUs, hardware, such as, for example, a special application specific integrated circuit ("ASIC"), or a combination of one or more CPUs and one or more pieces of hardware (e.g., ASICs). Further, the processes disclosed in the above-described configurations may be implemented by various manners, such as, for example, by the CPU executing one or more programs (e.g., computer-readable instructions) stored on computer-readable storage media (e.g., non-transitory media, such as a memory) or by methods.

While the invention has been described in connection with various exemplary structures and illustrative configurations, it will be understood by those skilled in the art that other variations and modifications of the structures, configurations, and embodiments disclosed above may be made without departing from the scope of the invention. For example, this application comprises each and every possible combination of the various elements and features disclosed and incorporated by reference herein, and the particular elements and features presented in the claims and disclosed and incorporated by reference above may be combined with each other in each and every possible way within the scope of the application, such that the application should be recognized as also directed to other embodiments comprising other possible combinations. Other structures, configurations, and embodiments consistent with the scope of the claimed invention will be apparent to those skilled in the art from a consideration of the specification or practice of the invention disclosed herein. It is intended that the specification and the described examples are illustrative with the true scope of the invention being defined by the following claims.

What is claimed is:

1. An image forming system comprising:
   a server comprising:
      a second storage device; and
      a second controller comprising a second one or more control devices; and
   an image forming apparatus comprising:
      a first storage device;
      a printing device configured to print an image corresponding to an image data piece stored in the first storage device;
      an accepting device configured to accept one or more instructions; and
      a first controller comprising a first one or more control devices,
   wherein the first controller is configured to:
      specify a print setting for a print-target image data piece based on the one or more instructions;
      start downloading the print-target image data piece from the server in response to specifying the print setting for the print-target image data piece;
      control the image forming apparatus to store the downloaded print-target image data piece in the first storage device; and
      control the printing device to print the downloaded print-target image data piece stored in the first storage device after accepting a print-start instruction at the accepting device, and
   wherein the second controller is configured to:
      transmit the print-target image data piece specified based on the one or more instructions accepted at the accepting device.

2. The image forming system according to claim 1, wherein the first controller is further configured to specify, from one or more image data pieces stored in the second storage device, the print-target image data piece based on the one or more instructions accepted at the accepting device.

3. The image forming system according to claim 1,
   wherein starting downloading the print-target image data piece from the server comprises downloading, as the print-target image data piece, a first image data piece transformed based on an existing print setting for the print-target image data piece, wherein the first controller is further configured to restart downloading the print-target image data piece from the server in response to accepting, as the print setting, an other print setting for the print-target image data piece that is different from the existing print setting for the print-target image data piece, wherein restarting downloading the print-target image data piece from the server comprises downloading, as the print-target image data piece, a second image data piece transformed based on the other print setting for the print-target image data piece, and wherein the first controller is configured to continue downloading the first image data piece from the server without restarting downloading when the difference between the other print setting is that the other print setting comprises at least one of a lower level of resolution and a smaller image size than the existing print setting.

4. The image forming system according to claim 1, wherein the first controller is further configured to:

determine whether the print-target image data piece is of a specific file type; and start downloading the print-target image data piece in response to specifying the print setting for the print-target image data piece when the controller determines that the print-target image data piece is not of the specific file type.

5. An image forming apparatus comprising:
a storage device;
a printing device configured to print an image corresponding to an image data piece stored in the storage device;
an accepting device configured to accept one or more instruction; and
a controller comprising one or more control device,
wherein the controller is configured to:
specify a print setting for a print-target image data piece based on the one or more instructions;
start downloading the print-target image data piece from a server in response to specifying the print setting for the print-target image data piece;
control the image forming apparatus to store the downloaded print-target image data piece in the storage device; and
control the printing device to print the image corresponding to the downloaded print-target image data piece stored in the storage device after accepting a print-start instruction at the accepting device.

6. The image forming apparatus according to claim 5, wherein the controller is further configured to specify, from one or more image data pieces stored in the server, the print-target image data piece based on the one or more instructions accepted at the accepting device.

7. The image forming apparatus according to claim 5, further comprising a display device configured to display one or more thumbnail images corresponding to one or more image data pieces stored in the server.

8. The image forming apparatus according to claim 5, wherein the controller is further configured to control the image forming apparatus to erase the downloaded print-target image data piece stored in the storage device in response to accepting an instruction to cancel printing of the downloaded print-target image data piece.

9. The image forming apparatus according to claim 5, wherein the controller is further configured to generate a printing image data piece corresponding to the downloaded print-target image data piece before accepting the print-start instruction at the accepting device, and wherein printing the image corresponding to the downloaded print-target image data piece stored in the storage device after accepting the print-start instruction at the accepting device comprises printing the image based on the generated printing image data piece.

10. The image forming apparatus according to claim 5,
wherein starting downloading the print-target image data piece from the server comprises downloading, as the print-target image data piece, a first image data piece transformed based on an existing print setting for the print-target image data piece, wherein the controller is configured to restart downloading the print-target image data piece from the server in response to accepting, as the print setting, an other print setting for the print-target image data piece that is different from the existing print setting for the print-target image data piece, and wherein restarting downloading the print-target image data piece from the server comprises downloading, as the print-target image data piece, a second image data piece transformed based on the other print setting for the print-target image data piece.

11. The image forming apparatus according to claim 5, wherein the controller is configured to stop downloading the print-target image data piece from the server in response to accepting, as the print setting, an other print setting for the print-target image data piece that is different from an existing print setting for the print-target image data piece.

12. The image forming apparatus according to claim 5,
wherein starting downloading the print-target image data piece from the server comprises downloading, as the print-target image data piece, a first image data piece transformed based on an existing print setting for the print-target image data piece, wherein the controller is further configured to restart downloading the print-target image data piece from the server in response to accepting, as the print setting, an other print setting for the print-target image data piece that is different from the existing print setting for the print-target image data piece, wherein restarting downloading the print-target image data piece from the server comprises downloading, as the print-target image data piece, a second image data piece transformed based on the other print setting for the print-target image data piece, and wherein the controller is configured to continue downloading the first image data piece from the server without restarting downloading when the difference between the other print setting is that the other print setting comprises a lower level of resolution than the existing print setting.

13. The image forming apparatus according to claim 5,
wherein starting downloading the print-target image data piece from the server comprises downloading, as the print-target image data piece, a first image data piece transformed based on an existing print setting for the print-target image data piece, wherein the controller is further configured to restart downloading the print-target image data piece from the server in response to accepting, as the print setting, an other print setting for the print-target image data piece that is different from the existing print setting for the print-target image data piece, wherein restarting downloading the print-target image data piece from the server comprises downloading, as the print-target image data piece, a second image data piece transformed based on the other print setting for the print-target image data piece, and wherein the controller is configured to continue downloading the first image data piece from the server without restarting downloading when the difference between the other print setting is that the other print setting comprises a smaller image size than the existing print setting.

14. The image forming apparatus according to claim 5, wherein the controller is further configured to:
   determine whether the print-target image data piece is of a specific file type; and
   start downloading the print-target image data piece in response to specifying the print setting for the print-target image data piece when the controller determines that the print-target image data piece is not of the specific file type.

15. The image forming apparatus according to claim 5,
   wherein starting downloading the print-target image data piece from the server comprises downloading, as the print-target image data piece, a first image data piece transformed based on an existing print setting for the print-target image data piece,
   wherein the controller is further configured to restart downloading the print-target image data piece from the server in response to accepting, as the print setting, an other print setting for the print-target image data piece that is different from the existing print setting for the print-target image data piece,
   wherein restarting downloading the print-target image data piece from the server comprises downloading, as the print-target image data piece, a second image data piece transformed based on the other print setting for the print-target image data piece, and
   wherein the controller is configured to continue downloading the first image data piece from the server without restarting downloading when the difference between the other print setting is that the other print setting comprises at least one of a lower level of resolution and a smaller image size than the existing print setting.

16. The image forming apparatus according to claim 5, wherein the controller is further configured to:
   determine whether the print-target image data piece is of a specific file type; and
   start downloading the print-target image data piece in response to specifying the print setting for the print-target image data piece when the controller determines that the print-target image data piece is not of the specific file type.

17. A non-transitory computer-readable medium storing computer-readable instructions that, when executed by a processor of an image forming apparatus, instruct the processor to perform processes comprising:
   specifying a print setting for a print-target image data piece based on one or more instructions accepted by the image forming apparatus;
   starting downloading the print-target image data piece from a server in response to specifying the print setting for the print-target image data piece;
   controlling the image forming apparatus to store the downloaded print-target image data piece in a storage device; and
   controlling the image forming apparatus to print an image corresponding to the downloaded print-target image data piece stored in the storage device after the image forming apparatus accepts a print-start instruction.

18. The non-transitory computer-readable medium according to claim 17, wherein the controller is further configured to specify, from one or more image data pieces stored in the server, the print-target image data piece based on the accepted one or more instructions.

19. An image forming apparatus comprising:
   a storage device;
   a printing device configured to print an image corresponding to an image data piece stored in the storage device;
   an accepting device configured to accept one or more instruction; and
   a controller comprising one or more control device,
   wherein the controller is configured to:
      specify, from one or more image data pieces stored in a server, the print-target image data piece based on the one or more instructions accepted at the accepting device;
      specify a print setting for the print-target image data piece based on the one or more instructions accepted at the accepting device;
      start downloading the print-target image data piece from a server in response to in response to at least one of specifying the print-target image data piece and specifying the print setting for the print-target image data piece;
      restart downloading the print-target image data piece from the server in response to accepting, as the print setting, an other print setting for the print-target image data piece that is different from the existing print setting for the print-target image data piece;
      control the image forming apparatus to store the downloaded print-target image data piece in the storage device; and
      control the printing device to print the image corresponding to the downloaded print-target image data piece stored in the storage device after accepting a print-start instruction at the accepting device,
   wherein the print-target image data piece is a first image data piece transformed based on an existing print setting for the print-target image data piece,
   wherein restarting downloading the print-target image data piece from the server comprises downloading, as the print-target image data piece, a second image data piece transformed based on the other print setting for the print-target image data piece, and
   wherein the controller is configured to continue downloading the first image data piece from the server without restarting downloading when the difference between the other print setting is that the other print setting comprises at least one of a lower level of resolution and a smaller image size than the existing print setting.

20. An image forming apparatus comprising:
   a storage device;
   a printing device configured to print an image corresponding to an image data piece stored in the storage device;
   an accepting device configured to accept one or more instruction; and
   a controller comprising one or more control device,
   wherein the controller is configured to:
      specify, from one or more image data pieces stored in a server, the print-target image data piece based on the one or more instructions accepted at the accepting device;
      specify a print setting for the print-target image data piece based on the one or more instructions accepted at the accepting device;
      determine whether the print-target image data piece is of a specific file type;

start downloading the print-target image data piece from the server in response to specifying the print-target image data piece when the controller determines that the print-target image data piece is of the specific file type;

start downloading the print-target image data piece in response to specifying the print setting for the print-target image data piece when the controller determines that the print-target image data piece is not of the specific file type;

control the image forming apparatus to store the downloaded print-target image data piece in the storage device; and control the printing device to print the image corresponding to the downloaded print-target image data piece stored in the storage device after accepting a print-start instruction at the accepting device.

* * * * *